United States Patent
Ohseki et al.

(10) Patent No.: US 12,273,892 B2
(45) Date of Patent: Apr. 8, 2025

(54) TERMINAL APPARATUS FOR EXECUTING TWO-STEP RANDOM ACCESS PROCEDURE, BASE STATION APPARATUS, AND CONTROL METHOD

(71) Applicant: KDDI CORPORATION, Tokyo (JP)

(72) Inventors: Takeo Ohseki, Fujimino (JP); Issei Kanno, Fujimino (JP); Kosuke Yamazaki, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 321 days.

(21) Appl. No.: 17/688,509

(22) Filed: Mar. 7, 2022

(65) Prior Publication Data

US 2022/0191845 A1 Jun. 16, 2022

Related U.S. Application Data

(63) Continuation of application No. PCT/JP2020/024081, filed on Jun. 19, 2020.

(30) Foreign Application Priority Data

Sep. 25, 2019 (JP) .................................. 2019-174156

(51) Int. Cl.
*H04W 72/23* (2023.01)
*H04W 74/0833* (2024.01)

(52) U.S. Cl.
CPC ....... *H04W 72/23* (2023.01); *H04W 74/0833* (2013.01)

(58) Field of Classification Search
CPC ............. H04W 72/23; H04W 74/0833; H04W 74/0836; H04L 1/18
See application file for complete search history.

(56) References Cited

U.S. PATENT DOCUMENTS

2014/0254461 A1* 9/2014 Li ........................... H04L 1/004
370/312
2021/0112600 A1* 4/2021 Lei ......................... H04W 72/04
(Continued)

OTHER PUBLICATIONS

Extended European Search Report issued in corresponding European Patent Application No. 20868574.3, dated Oct. 12, 2022 (6 pages).

(Continued)

*Primary Examiner* — Deepa Belur
(74) *Attorney, Agent, or Firm* — Foley & Lardner LLP

(57) ABSTRACT

A terminal apparatus transmits a predetermined message to a base station apparatus based on a two-step random access procedure, upon receiving one signal that is transmitted from the base station apparatus in response to the predetermined message, and includes pieces of upper layer control information for the terminal apparatus and another terminal apparatus in a multiplexed manner, specifies a first radio resource for transmitting a first response signal indicating whether or not succeeded in receiving control information that is for the terminal apparatus and is included in the one signal, and is different from a second radio resource for transmitting a second response signal for the other terminal apparatus, based on at least one of a control signal that is used for transmitting the one signal and the one signal, and transmits the first response signal using the first radio resource.

8 Claims, 5 Drawing Sheets

(56) References Cited

U.S. PATENT DOCUMENTS

| | | | | |
|---|---|---|---|---|
| 2021/0152234 A1* | 5/2021 | Zhou | ............... | H04L 1/1822 |
| 2022/0046717 A1* | 2/2022 | Zhang | ............... | H04L 1/1861 |
| 2022/0369376 A1* | 11/2022 | Lin | ............... | H04W 74/0833 |
| 2023/0217306 A1* | 7/2023 | Kim | ............... | H04L 69/24 |
| | | | | 370/329 |

OTHER PUBLICATIONS

Nokia, Nokia Shanghai Bell, "On 2-step RACH Procedure", 3GPP TSG RAN WG1 #96bis R1-1904716, Apr. 2019 (16 pages).

ZTE Corporation, Sanechips, "New work item: 2-step RACH for NR", 3GPP TSG RAN Meeting #82 RP-182894, Dec. 2018, 5 pages.

Nokia, Nokia Shanghai Bell, "Feature lead summary#4 on 2 step RACH procedures", 3GPP TSG RAN WG1 #98 R1-1909775, Aug. 2019, 57 pages.

Huawei, Hisilicon, "Discussion on 2-step RACH procedure", 3GPP TSG RAN WG1 Meeting #98 R1-1908034, Aug. 2019, 15 pages.

Nokia, Nokia Shanghai Bell, "On 2 step RACH procedure", 3GPP TSG RAN WG1 #98 R1-1908342, Aug. 2019, 31 pages.

\* cited by examiner

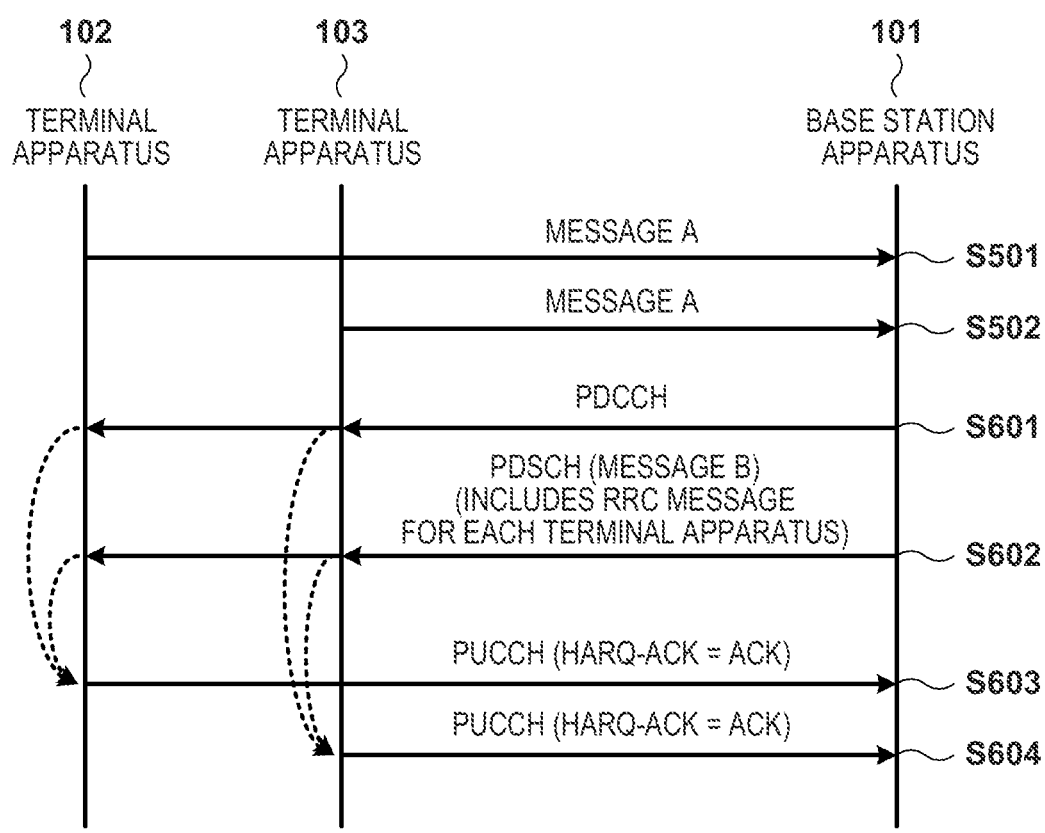

TERMINAL APPARATUS FOR EXECUTING TWO-STEP RANDOM ACCESS PROCEDURE, BASE STATION APPARATUS, AND CONTROL METHOD

CROSS-REFERENCE TO RELATED APPLICATION(S)

This application is a continuation of International Patent Application No. PCT/JP2020/024081 filed on Jun. 19, 2020, which claims priority to and the benefit of Japanese Patent Application No. 2019-174156 filed on Sep. 25, 2019, the entire disclosures of which are incorporated herein by reference.

BACKGROUND OF THE INVENTION

Field of the Invention

The present invention relates to a terminal apparatus, a base station apparatus, and a control method, and specifically relates to a technique for improving efficiency and reliability of message transmission in a two-step random access procedure.

Description of the Related Art

In the 3rd Generation Partnership Project (3GPP), standards of wireless communication systems such as the Long-Term Evolution (LTE) and the New Radio (NR) of the fifth generation (5G) are developed. In LTE and NR, a random access procedure for initial connection between a terminal apparatus and a base station apparatus is defined. Also, in 3GPP, adoption of a two-step random access procedure is examined in order to establish the initial connection in a period of time shorter than the known four-step random access procedure (refer to 3GPP, RP-182894). In the two-step random access procedure, first, a terminal apparatus transmits a message A that corresponds to a message 1 and a message 3 in the four-step random access procedure, and includes a random access preamble and predetermined information for initial access. Also, a base station apparatus is configured to transmit, in response to the message A, a message B that corresponds to a message 2 and a message 4 in the four-step random access procedure. Note that, with the message B, when the connection is normally established, information regarding the MAC (media access control) layer such as timing advance and information regarding the RRC (radio resource control) layer such as RRC Connection Setup may be transmitted to the terminal apparatus.

It is envisioned that a base station apparatus receives messages A from a plurality of terminal apparatuses in parallel. It is requested that, in this case, a message B is transmitted to each terminal apparatus highly efficiently. Also, since the message B is used to notify terminal apparatuses of information regarding the MAC layer and information regarding the RRC layer, as described above, it is important that transmission to terminal apparatuses is performed highly reliably.

SUMMARY OF THE INVENTION

The present invention provides a technique for notifying a terminal apparatus of information transmitted by a base station apparatus highly reliably and highly efficiently, in the two-step random access procedure.

A terminal apparatus according to one aspect of the present invention is a terminal apparatus including a communication unit, wherein the communication unit is controlled to transmit a predetermined message to a base station apparatus based on a two-step random access procedure, upon receiving one signal that is transmitted from the base station apparatus in response to the predetermined message, and includes pieces of upper layer control information for the terminal apparatus and another terminal apparatus in a multiplexed manner, specify a first radio resource for transmitting a first response signal indicating whether or not succeeded in receiving control information that is for the terminal apparatus and is included in the one signal, and is different from a second radio resource for transmitting a second response signal indicating whether or not the other terminal apparatus has succeeded in receiving control information that is for the other terminal apparatus and is included in the one signal, based on at least one of a control signal that is used for transmitting the one signal and the one signal, and transmit the first response signal using the first radio resource.

A base station apparatus according to one aspect of the present invention is a base station apparatus including a communication unit, wherein the communication unit is controlled to receive predetermined messages from a plurality of terminal apparatuses based on a two-step random access procedure, transmit one signal including pieces of control information regarding upper layers for the respective terminal apparatuses in a multiplexed manner to the plurality of terminal apparatuses, in response to the predetermined messages, designate radio resources using which response signals indicating whether or not succeeded in receiving the control information are to be transmitted in response to the one signal and that are different between the plurality of terminal apparatuses, using at least one of a control signal used to transmit the one signal and the one signal, and receive the response signals from the plurality of terminal apparatuses, respectively, in the radio resources designated with respect to the respective terminal apparatuses.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 6 is a diagram illustrating an example of a processing flow to be executed in the system.

DESCRIPTION OF THE EMBODIMENTS

Figure 1:
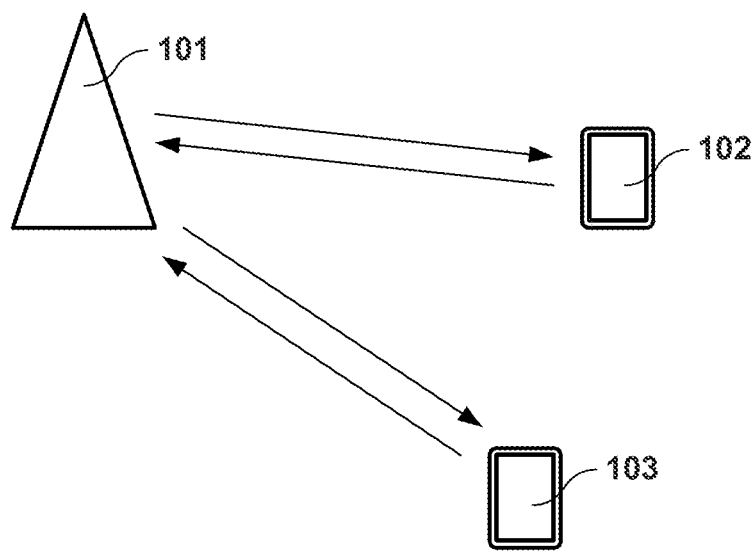
FIG. 1 is a diagram illustrating an exemplary configuration of a wireless communication system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

System Configuration

FIG. 1 shows an exemplary configuration of a wireless communication system according to s present embodiment. This system is a 5G cellular communication system, in one example. Note that there is no limitation thereto, and this system may be a cellular communication system of a 5G successor, or may be a wireless communication system other than the cellular communication system, for example. This system includes a base station apparatus 101, a terminal apparatus 102, and a terminal apparatus 103. Note that in FIG. 1, in order to facilitate understanding, only one base station apparatus and two terminal apparatuses are illustrated. However, the numbers of the apparatuses are not limited thereto, and more base station apparatuses and terminal apparatuses may be naturally present.

The terminal apparatus 102 and terminal apparatus 103 according to the present embodiment attempt to establish connection with the base station apparatus 101 by executing a two-step random access procedure (hereinafter, this procedure is referred to as "two-step RACH"). As described above, in two-step RACH, a terminal apparatus transmits a message A including a preamble and predetermined information for initial access to the base station apparatus. Then, the base station apparatus 101 transmit, to the terminal apparatus that has transmitted the message A, information regarding the MAC layer such as timing advance and information regarding the RRC layer such as RRC Connection Setup by a message B, in response to the message A.

The base station apparatus 101 may receive messages A from a plurality of terminal apparatuses in parallel. Here, it is important to efficiently transmit a message B. Therefore, the base station apparatus 101 according to the present embodiment transmits the information regarding the MAC layer and the information regarding the RRC layer for each of the plurality of terminal apparatuses in a multiplexed manner. Also, these pieces of information are control information, and therefore need to be transmitted to terminal apparatuses using a method with which high reliability can be achieved. In the present embodiment, considering that the information to be transmitted is information in an upper layer such as the RRC layer, a hybrid automatic repeat request (HARQ) is assumed to be used in order to achieve high reliability. As a result of these schemes functioning appropriately, it is possible to transmit, highly efficiently and highly reliably, information to a terminal apparatus by the message B.

The message B is transmitted through a physical downlink shared channel (PDSCH). Here, when pieces of information for a plurality of terminal apparatuses are transmitted in a multiplexed manner, these pieces of information may be transmitted through one PDSCH. Also, the base station apparatus 101 can designate radio resources by one physical downlink control channel (PDCCH) when performing transmission through one PDSCH.

When a message B is transmitted using HARQ, a response signal (ACK or NACK) for indicating whether or not a terminal apparatus has normally received the message B needs to be transmitted. However, it is envisioned that the terminal apparatus cannot specify the radio resource that is to be used to transmit the response signal. Although a configuration may be adopted in which the radio resource using which a response signal is to be transmitted is determined based on the radio resource by which PDCCH has been transmitted, for example, when one PDCCH is used with respect to a plurality of terminal apparatuses, as a result of the plurality of terminal apparatuses using the same radio resource, response signals may collide.

In the present embodiment, in light of the foregoing, a method is adopted for causing HARQ to appropriately function when messages B are multiplexed by making response signals be appropriately transmitted. In the present embodiment, as such a method, a method is adopted in which when a base station apparatus receives messages A from a plurality of terminal apparatuses in parallel, a signal (message B) in which pieces of information regarding the MAC layer and the RRC layer (that is, upper layer information) for the respective terminal apparatuses are multiplexed is transmitted. Here, in a first example, the base station apparatus transmits a downlink control signal for transmitting this signal (e.g., including scheduling information) through different PDCCHs. Then, the terminal apparatuses are notified of radio resources (time/frequency resource) for transmitting HARQ response signals (HARQ-ACK) with respect to the respective pieces of upper layer information by the respective PDCCHs. Note that, in these two or more PDCCHs, one physical packet (PDSCH) is designated as a downlink signal thereafter. Then, in the one physical packet, pieces of upper layer information for the respective terminal apparatuses are transmitted in a multiplexed manner. Each terminal apparatus extracts and receives information addressed to the terminal apparatus from the one physical packet, and transmits, to the base station apparatus, a response signal indicating whether or not reception is successful using a radio resource designated by PDCCH addressed to the terminal apparatus. Note that a response signal is transmitted through a physical uplink control channel (PUCCH), for example. Note that, in one example, PDCCHs for two or more terminal apparatus are scrambled using different sequences.

Also, in a second example, the base station apparatus 101 transmits the downlink control signal for transmitting the response signals by a common PDCCH, and transmits information with which different radio resources using which the terminals transmit respective response signals can be designated in PDSCH transmitted thereafter. The base station apparatus may transmit information for designating the radio resource using which each terminal apparatus transmits the response signal, while the information being included in one PDSCH along with upper layer information to be multiplexed described above, for example. Each terminal apparatus, upon receiving PDSCH, extracts and receives information addressed to the terminal apparatus, and specifies a radio resource to be used to transmit a response signal. Also, each terminal apparatus transmits the response signal indicating whether or not reception is successful to the base station apparatus using the specified radio resource. Also, for example, the configuration may be such that a radio resource to be used by one terminal apparatus to transmit a response signal is designated by PDCCH, and a radio resource to be used by another terminal apparatus to transmit a response signal is designated by including a value indicating the difference between the radio resources in PDSCH. For example, the frequency resource to be used by a first terminal apparatus to transmit a response signal is designated as "f" by PDCCH, and "Δf" may be designated by PDSCH as information relating to the frequency resource to be used by a second terminal apparatus to transmit a response signal. In this case, the first terminal apparatus transmits a response signal using a frequency resource "f", and the second terminal apparatus may transmit a response signal using a frequency resource "f+Δf". Similarly, regarding the time resources, the time resource to be used by one terminal apparatus to transmit a response signal may be designated by PDCCH, and the difference between the time resource and the time resource to be used by another terminal apparatus to transmit a response signal may be designated by PDSCH. Note that a predetermined reference radio resource may be designated by PDCCH, the differences between the radio resources to be used by respective terminal apparatuses to transmit response signals and the reference radio resource may be designated by PDSCH.

Note that when information for designating a radio resource for transmitting a response signal is transmitted by PDSCH, the information may be transmitted while being included in a MAC sub-header of PDSCH. Also, when information for designating radio resources for transmitting response signals are transmitted by PDSCH, each terminal apparatus may specify, based on the multiplexing order of the terminal apparatus in PDSCH, the radio resource corresponding to the order as the radio resource to be used by the terminal apparatus to transmit a response signal. The radio resource to be used by a terminal apparatus to transmit a response signal may be implicitly indicated by the multiplexing order of the terminal apparatus. In this case, the relationship between the multiplexing orders and the radio resources to be used for transmitting response signals is shared between the base station apparatus and the terminal apparatuses. In one example, the base station apparatus broadcasts information for designating this relationship while the information being included in a reporting signal, and the terminal apparatuses can specify the relationship by receiving the reporting signal. Also, each terminal apparatus, upon receiving PDSCH, specifies the multiplexing order of the terminal apparatus, specifies the radio resource to be used according to the order, and transmits a response signal to the base station apparatus using the specified radio resource. Note that the information regarding radio resources indicated by this relationship may be differences from a radio resource specified based on the radio resource using which PDCCH has been transmitted, for example. That is, the configuration may be such that one radio resource is specified from the radio resource used to transmit PDCCH, and the radio resource to be used by a terminal apparatus to transmit a response signal is specified based on the multiplexing order, with the specified radio resource being the reference.

As described above, pieces of upper layer control information for the plurality of terminal apparatuses are multiplexed in one physical packet (PDSCH), and are transmitted to the plurality of terminal apparatuses. Here, the radio resources to be used for transmitting response signals indicating whether or not the control information has been successfully received are designated so as to be different between terminal apparatuses. Accordingly, in two-step RACH, control information can be transmitted highly efficiently by multiplexing, and the reliability can be improved by using HARQ.

Note that upon receiving a message A from one terminal apparatus, the base station apparatus may wait for receiving messages A from other terminal apparatuses for a predetermined period of time. That is, the configuration may be such that upon receiving a message A from one terminal apparatus, the base station apparatus waits for messages A from other terminal apparatuses, and the probability that pieces of upper layer control information addressed to a plurality of terminal apparatuses are transmitted in a multiplexed manner is increased, instead of immediately transmitting a message B.

Also, when the base station apparatus transmits pieces of upper layer control information for a plurality of terminal apparatuses in a multiplexed manner in response to the messages A from the plurality of terminal apparatuses, if the base station apparatus receives a response signal indicating that the reception of the signal is failed from at least one of the plurality of terminal apparatuses, the base station apparatus retransmits the signal that was transmitted. Here, the base station apparatus retransmits information for terminal apparatuses that have succeeded in receiving the signal as well, instead of retransmitting only information for a terminal apparatus that has failed in receiving the signal. Accordingly, as a result of a signal relating to the same information being retransmitted, in terminal apparatuses that have received the signal, a gain can be obtained by combining the reception signals. Note that only the information for a terminal apparatus that has failed in receiving the signal may be retransmitted. For example, when, after signals addressed to many terminal apparatuses were transmitted in a multiplexed manner, only a small number of terminal apparatuses failed in receiving the signals, the degradation in frequency usage efficiency due to signals addressed to the many terminal apparatus being transmitted for the sake of the small number of terminal apparatuses can be suppressed.

Apparatus Configuration

Figure 2:
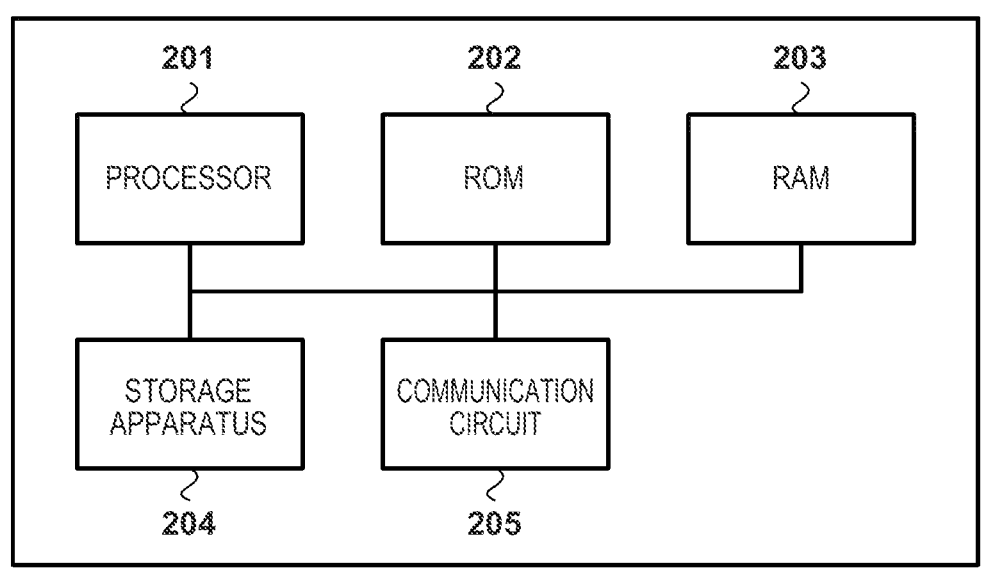
FIG. 2 is a diagram illustrating an exemplary hardware configuration of a base station apparatus and a terminal apparatus.

Next, the configuration of the terminal apparatus and the base station apparatus that execute the processing described above will be described. FIG. 2 shows an exemplary hardware configuration of the terminal apparatus and the base station apparatus. In one example, the terminal apparatus and the base station apparatus each includes a processor 201, a ROM 202, a RAM 203, a storage apparatus 204, and a communication circuit 205. In the terminal apparatus, the processor 201 executes a program that can be read by a computer that realizes the functions of the terminal apparatus described above, and is recorded in any of the ROM 202, RAM 203, and the storage apparatus 204, for example. Similarly, in the base station apparatus, the processor 201 executes a program for realizing the functions of the base station apparatus described above, and is recorded in any of the ROM 202, RAM 203, and the storage apparatus 204, for example. Note that the processor 201 may also be replaced by one or more processors such as an ASIC (application-specific integrated circuit), an FPGA (field programable gate array), and a DSP (digital signal processor).

The terminal apparatus and the base station apparatus performs communication with a partner apparatus (a base station apparatus for a terminal apparatus, a terminal apparatus or a network node for a base station apparatus, for example) by the processors 201 controlling the communication circuits 205, for example. Note that, in FIG. 2, a schematic diagram is illustrated in which the terminal apparatus and the base station apparatus each have one communication circuit 205, but there is no limitation thereto. For example, the terminal apparatus may include a communication apparatus for performing communication with the base station apparatus and a communication apparatus for a wireless LAN and the like. Also, the base station apparatus may include a communication apparatus for performing communication with a terminal apparatus and a communication apparatus for performing communication with a network node, for example.

Figure 3:
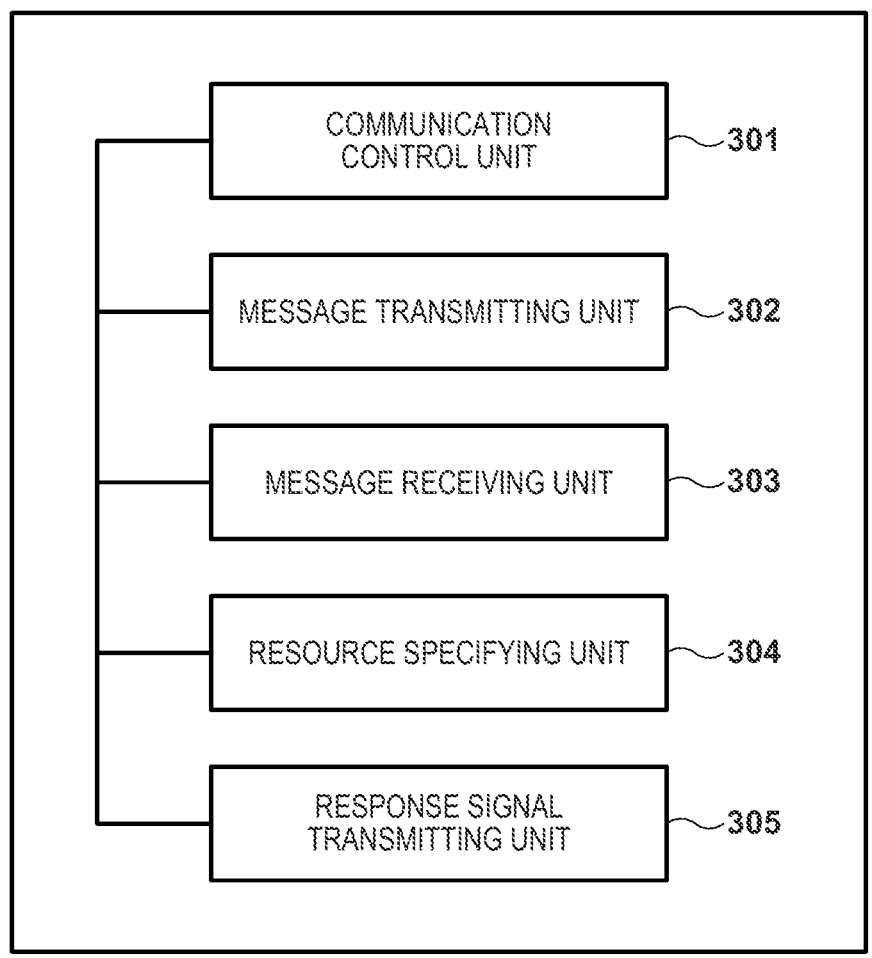
FIG. 3 is a diagram illustrating an exemplary functional configuration of the terminal apparatus.

FIG. 3 shows an exemplary functional configuration of the terminal apparatus. The functions shown in FIG. 3 are realized by the processor 201 of the terminal apparatus executing a program stored in the ROM 202, the RAM 203, or the storage apparatus 204, for example. Note that the terminal apparatus may include hardware corresponding to at least any of the later-described functions. Note that, FIG. 3 selectively shows functional units specifically relating to the present embodiment, out of the functions of the terminal apparatus, and the terminal apparatus may of course also have functions as a common terminal apparatus.

The terminal apparatus is configured to include a communication control unit 301, a message transmitting unit 302, a message receiving unit 303, a resource specifying unit 304, and a response signal transmitting unit 305, as its functions, for example.

The communication control unit 301 controls the communication that the terminal apparatus executes with the base station apparatus (e.g., wireless communication conforming to the 5G communication standard). The communication control unit 301 acquires information transmitted from the base station apparatus, establishes connection with the base station apparatus by executing two-step RACH based on the information, and executes control for performing communication, for example. The message transmitting unit 302 generates a message A for two-step RACH, and transmits the message A to the base station apparatus via the communication control unit 301. The message receiving unit 303 receives a message B that the base station apparatus transmits in response to the transmission of the message A via the communication control unit 301. Here, the message B is assumed to be a message that is transmitted while being included in PDSCH that is scheduled by PDCCH transmitted from the base station apparatus, but the combination between PDCCH and PDSCH may also be referred to as a message B. Note that this message may be received as one physical packet in which information regarding an upper layer (in particular, RRC layer) for the terminal apparatus itself and upper layer information for another terminal apparatus are multiplexed. Therefore, the message receiving unit 303, upon receiving a packet in which pieces of information addressed to a plurality of terminal apparatuses are multiplexed, extracts information addressed to the own apparatus from the packet. The resource specifying unit 304 specifies a radio resources (frequency/time resource) for transmitting a response signal indicating whether or not reception of an upper layer message is successful, based on information included in at least one of PDCCH and PDSCH. The response signal transmitting unit 305 transmit the response signal using the radio resource specified by the resource specifying unit 304 via the communication control unit 301.

Figure 4:
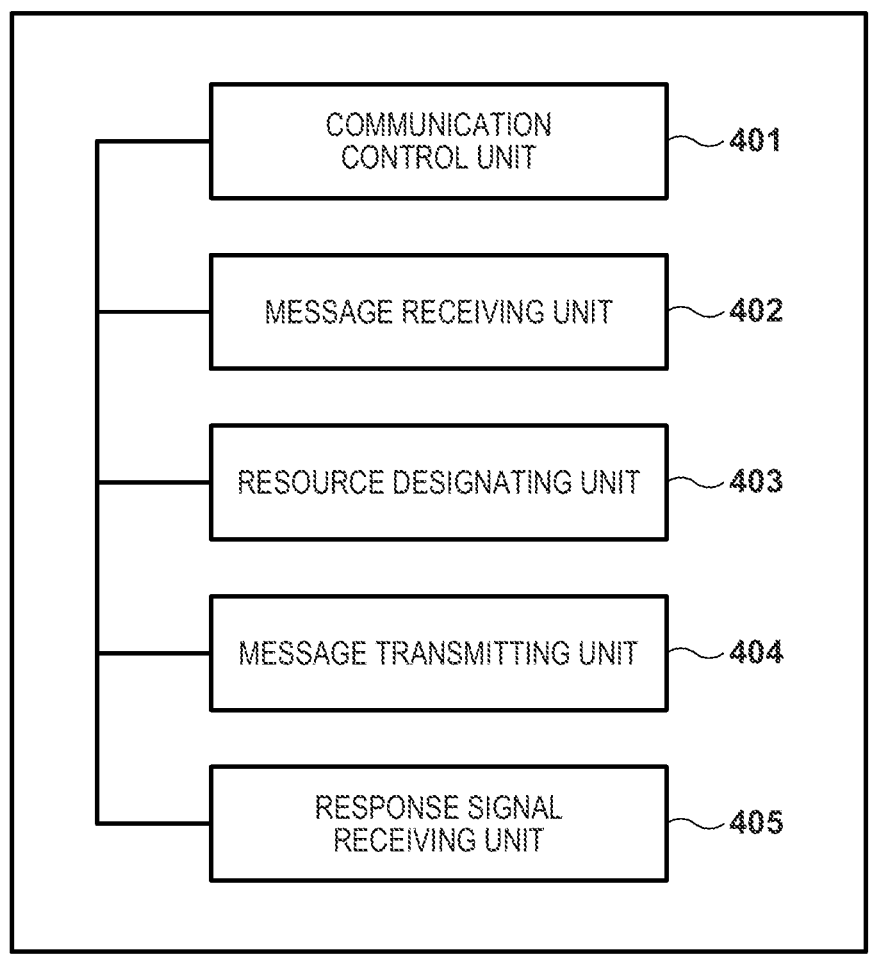
FIG. 4 is a diagram illustrating an exemplary functional configuration of the base station apparatus.

FIG. 4 shows an exemplary functional configuration of the base station apparatus. The functions shown in FIG. 4 are realized by the processor 201 of the base station apparatus executing a program stored in the ROM 202, the RAM 203, or the storage apparatus 204, for example. Note that the base station apparatus may include hardware corresponding to at least any of the later-described functions. Note that, FIG. 4 selectively shows functional units specifically relating to the present embodiment, out of the functions of the base station apparatus, and the base station apparatus may of course also have functions as a common base station apparatus.

The base station apparatus is configured to include a communication control unit 401, a message receiving unit 402, a resource designating unit 403, a message transmitting unit 404, and a response signal receiving unit 405, as its functions, for example.

The communication control unit 401 controls the communication that the base station apparatus executes with a terminal apparatus (e.g., wireless communication conforming to the 5G communication standard). The communication control unit 301 establishes a connection with the terminal apparatus based on two-step RACH being started by the terminal apparatus, and performs control for performing communication, for example.

The message receiving unit 402 receives a message A for two-step RACH that is transmitted from the terminal apparatus via the communication control unit 401. Note that when the message receiving unit 402 receives a message A from one terminal apparatus, the message receiving unit 402 may wait for a message A from another terminal apparatus for a predetermined period of time. That is, as a result of the base station apparatus waiting for reception of messages A from a plurality of terminal apparatuses for a predetermined period of time, the base station apparatus transmits pieces of upper layer information for a plurality of terminal apparatuses in a multiplexed manner as far as possible. Accordingly, the probability that two-step RACH can be executed highly efficiently can be increased.

When a signal (message B) including information regarding an upper layer such as the RRC layer is transmitted in response to the message A, the resource designating unit 403 designates a radio resource that is to be used by a terminal apparatus to transmit a response signal indicating whether the signal has been normally received. For example, when messages A from a plurality of terminal apparatuses are received in parallel, and pieces of information regarding an upper layer such as the RRC layer are transmitted to these terminal apparatuses in a multiplexed manner, the resource designating unit 403 designates the radio resources such that the radio resources to be used by the terminal apparatuses to transmit response signals are different from each other. Note that the resource designating unit 403, when transmitting an upper layer information in response to a message A from a single terminal apparatus, need not specify a specific radio resource.

In order to designate different radio resources, the resource designating unit 403 uses different PDCCHs for the plurality of terminal apparatuses, for example. Also, each PDCCH designates a common radio resource to be used by the base station apparatus to transmit PDSCH including upper layer information, and also designate a different radio resource for transmitting a response signal. Note that the designation of a radio resource may be implicitly performed using a radio resource that is used for PDCCH, may be expressly performed by information that is transmitted in PDCCH, or may also be performed by combining these methods. Accordingly, each of the plurality of terminal apparatuses can receive PDCCH that is separately transmitted to the terminal apparatus, receive PDSCH that is common between the terminal apparatuses and in which pieces of information to the terminal apparatuses are multiplexed, and transmit a response signal using the radio resource that is separately designated by PDCCH that is addressed to the terminal apparatus.

Also, the resource designating unit 403 may designate a radio resource to be used for a common PDSCH using PDCCH that is common between a plurality of terminal apparatuses, and designate radio resources to be used by the respective terminal apparatuses to transmit a response signal in pieces of information that is multiplexed in the PDSCH, for example. In this case, each terminal apparatus that has transmitted a message A receives a common PDCCH, and specify the radio resource that is used to transmit PDSCH based on the PDCCH. Then, each terminal apparatus extracts information addressed to the terminal apparatus from pieces of information multiplexed in PDSCH, and can specify the radio resource for transmitting a response signal based on the information. Note that the radio resource for transmitting a response signal may be expressly designated by the information for specifying the radio resource to be used by each terminal apparatus being included in information such as a MAC sub-frame that is to be multiplexed, for example. Also, the radio resources for transmitting response signals may also be implicitly designated by multiplexing orders, the multiplexing orders being the orders of a plurality of terminal apparatuses at the time of multiplexing and being associated with the radio resources in advance, for example. In this case, each terminal apparatus specifies the radio resource for transmitting a response according to the arrangement order of the information addressed to the terminal apparatus when multiplexed, out of the pieces of information that are multiplexed.

Note that when the radio resources for transmitting response signals are designated by PDSCH, a radio resource serving as a reference is designated by PDCCH, and information indicating the difference between the radio resource serving as a reference and the radio resource using which each terminal apparatus transmits a response signal may be designated in PDSCH. That is, the resource designating unit 403 designates a radio resource for transmitting a response signal that is different for each terminal apparatus by at least one of PDCCH and PDSCH.

The message transmitting unit 404 transmits a message B in response to reception of a message A from a terminal apparatus via the communication control unit 401. The message B includes information regarding upper layers such as the MAC layer and the RRC layer, and can include these pieces of information for a plurality of terminal apparatuses in a multiplexed format. The message transmitting unit 404 transmits the message B in a format according to the designation method of radio resources that is used by the resource designating unit 403. For example, when the resource designating unit 403 determines that PDCCH that is different for each terminal apparatus is to be used, the message transmitting unit 404 transmits a message B (PDSCH) that does not include information for designating a radio resource to be used by a terminal apparatus to transmit a response signal, regarding a message that is transmitted in PDSCH. On the other hand, when the resource designating unit 403 determines that PDCCH that is common between terminal apparatuses is to be used, the message transmitting unit 404 transmits a message B in a format of including information for designating a radio resource to be used by a terminal apparatus to transmit a response signal (information for directly designating a radio resource or information for designating a difference from a radio resource serving as a reference). Note that when the radio resource to be used by a terminal apparatus to transmit a response signal is designated by the multiplexing order, the message transmitting unit 404 need not include information that explicitly designates a radio resource to be used by a terminal apparatus to transmit a response signal.

The response signal receiving unit 405 receives, from each terminal apparatus, a response signal indicating whether or not information (message B) transmitted from the base station apparatus has been successfully received in a radio resource designated by the resource designating unit 403. If the response signal receiving unit 405 has received response signals indicating that the signal reception was successful from all of the plurality of terminal apparatuses, the connection between the base station apparatus and the terminal apparatuses has been established, and the terminal apparatuses transition to a connected state. On the other hand, if the response signal receiving unit 405 has received a response signal indicating that the signal reception was failed from one of the plurality of terminal apparatuses, the message transmitting unit 404 retransmits a signal in which pieces of information for the plurality of terminal apparatuses are multiplexed, similarly to the signal transmitted previously. Note that the retransmission signal here may be a signal that is the same as the signal transmitted previously, or may be a signal that includes the same information in a different mode such as a signal including information in a different redundancy version, for example. Accordingly, a terminal apparatus that failed in receiving the signal attempts demodulation again by combining the retransmitted signal with the signal received previously. As a result of combining signals transmitted a plurality of times, a combined gain can be obtained, and therefore the probability that a terminal apparatus succeeds in receiving the signal can be increased. Also, if the response signal receiving unit 405 has received a response signal indicating that the signal reception was failed from one of the plurality of terminal apparatuses, the message transmitting unit 404 may transmit a signal including information only for the terminal apparatus that failed in receiving the signal. In this case, the combined gain cannot be obtained in the terminal apparatuses, but when the number of terminal apparatuses that failed in receiving the signal is small, for example, the signal can be efficiently retransmitted.

Processing Flow

Figure 5:
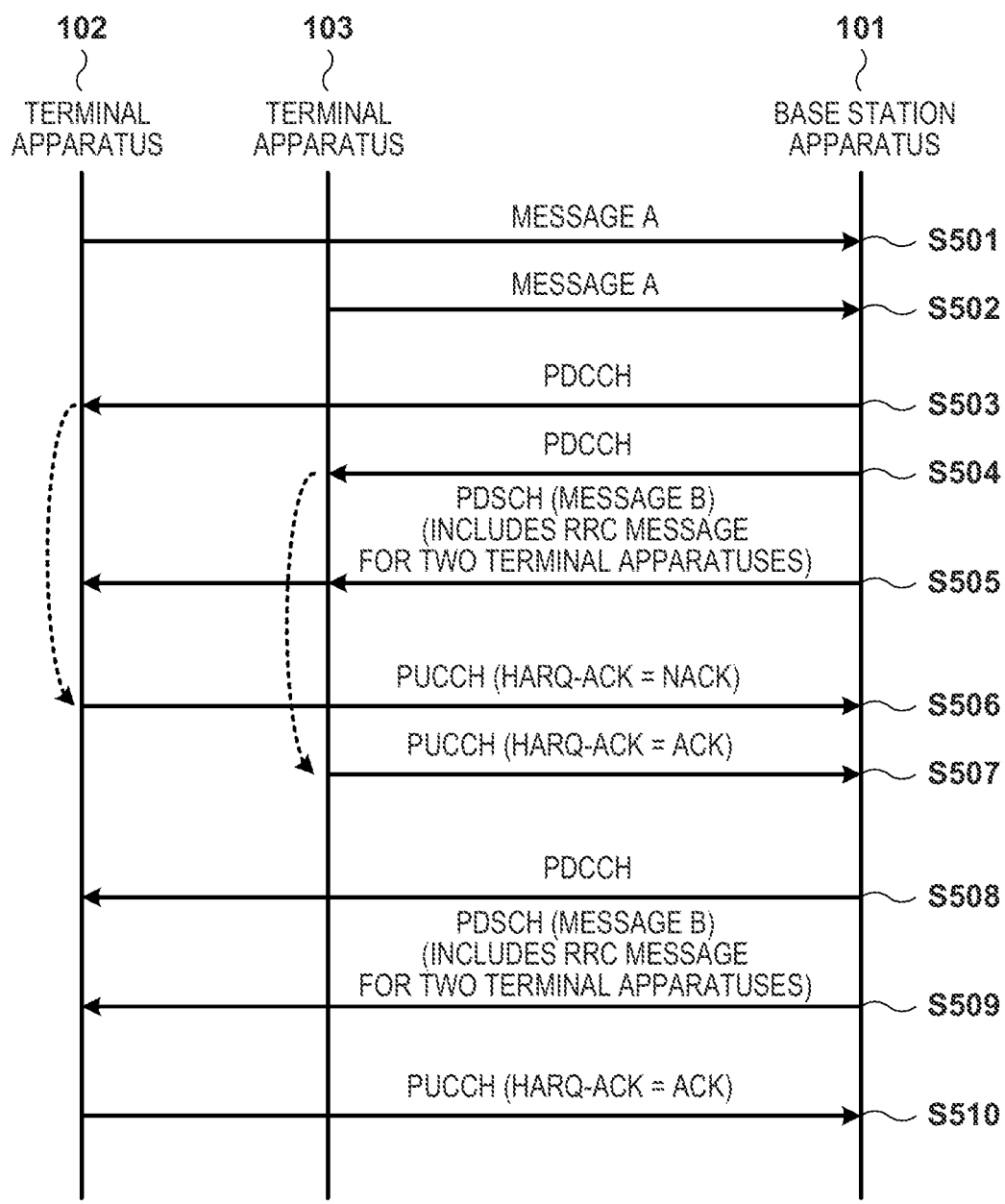
FIG. 5 is a diagram illustrating an example of a processing flow to be executed in a system.

Next, the outline of the processing flow according to the present embodiment will be described. FIG. 5 shows an example when different PDCCHs are used for the respective terminal apparatuses, and FIG. 6 shows an example when the radio resource for transmitting a response signal can be specified by PDSCH. Note that, in FIGS. 5 and 6, processing that is performed when two terminal apparatuses 102 and 103 transmit messages A to the base station apparatus 101 in a state that is shown in FIG. 1 (S501, S502) is described, but the number of the terminal apparatuses is not limited to two, and similar processing may be performed when three or more terminal apparatuses transmit messages A in parallel.

In FIG. 5, upon receiving messages A from the two terminal apparatuses 102 and 103, the base station apparatus 101 transmits a message B in response thereto. The base station apparatus 101 designates a radio resource using which a data signal (PDSCH) including messages is to be transmitted by a control signal (PDCCH), and transmits the data signal using the designated radio resource. Here, in the example in FIG. 5, PDCCHs are transmitted to the terminal apparatuses using different radio resources (S503, S504). Also, in the two PDCCHs, one common radio resource for transmitting PDSCH is designated. Therefore, the terminal apparatuses 102 and 103 receive PDSCH using the same radio resource (S505). A message B in which RRC messages for the respective terminal apparatuses are included in a multiplexed manner is transmitted by this PDSCH. The terminal apparatuses 102 and 103 extract and acquire information addressed to the respective apparatuses from the multiplexed information. Also, the terminal apparatuses 102 and 103 transmit signals (HARQ-ACK) indicating whether or not acquisition of this information is successful to the base station apparatus 101 using uplink control signals (PUCCHs) (S506, S507). Here, the radio resources used by the terminal apparatuses to transmit HARQ-ACKs are specified based on the radio resources that were used when PDCCHs were transmitted to the terminal apparatuses or the information included in the PDCCHs.

Here, it is assumed that the terminal apparatus 102 has failed in receiving information (S506). In this case, the base station apparatus 101 retransmits the information for the terminal apparatus 102. Here, a signal including information for the terminal apparatus 103 that has succeeded in receiving information as well is transmitted such that a combined gain can be obtained in the terminal apparatuses (S508, S509), similarly to the signal transmitted in step S505. Accordingly, the number of retransmission times can be prevented from unnecessarily increasing, and efficiency reduction can be prevented. Note that information only for the terminal apparatus 102 may be retransmitted, as described above. Upon succeeding in receiving the information due to retransmission in step S509, the terminal apparatus 102 returns ACK (S510), and establishes connection with the base station apparatus 101.

In FIG. 6, the base station apparatus 101 transmits PDCCH that is common between the two terminal apparatuses 102 and 103 (S601). In this case, since the number of PDCCH is one, if the terminal apparatuses determine the radio resources for response signals based on this PDCCH, the terminal apparatuses may determine the same radio resource, and the response signals may collide. On the other hand, in the example in FIG. 6, information for making the radio resources for transmitting response signals different is included in pieces of information for the terminal apparatuses that are to be multiplexes in PDSCH (S602). These pieces of information may be expressly indicated by MAC sub-headers that are to be multiplexed, or may be implicitly indicated by multiplexing orders, for example. Then, the terminal apparatuses transmit HARQ-ACKs respectively using the radio resources indicated by PDSCH (S603, S604). Here, the terminal apparatuses may specify the radio resources for transmitting response signals further based on radio resources used for transmitting PDCCHs and information included in PDCCHs. For example, a frequency resource obtained by adding a difference indicated by PDSCH to the reference frequency resource indicated by PDCCH may be specified as the radio resource for transmitting a response signal.

As described above, the efficiency of two-step RACH can be improved by the transmission of upper layer information such as an RRC message being multiplexed in a message B, and the reliably thereof can be improved by using HARQ.

According to the present invention, information transmitted by a base station apparatus can be notified to a terminal apparatus highly reliably and highly efficiently, in the two-step random access procedure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A terminal apparatus including a communication unit, wherein the communication unit is controlled to
    transmit a predetermined message to a base station apparatus based on a two-step random access procedure,
    upon receiving one signal that is transmitted from the base station apparatus in response to the predetermined message, and includes a physical downlink control channel (PDCCH) and a physical downlink shared channel (PDSCH) including pieces of upper layer control information for the terminal apparatus and another terminal apparatus in a multiplexed manner,
    specify a first radio resource for transmitting a first response signal indicating whether or not succeeded in receiving control information that is for the terminal apparatus and is included in the one signal, and is different from a second radio resource for transmitting a second response signal indicating whether or not the other terminal apparatus has succeeded in receiving control information that is for the other terminal apparatus and is included in the one signal, based on information designating a predetermined reference radio resource by the PDCCH of the one signal and designating difference between the first radio resource and the predetermined reference radio resource by the PDSCH of the one signal, and
    transmit the first response signal using the first radio resource.

2. The terminal apparatus according to claim 1, wherein the difference between the first radio resource and the predetermined reference radio resource is provided by MAC (media access control) sub-headers for transmitting control information for the terminal apparatus in the PDSCH of the one signal.

3. A base station apparatus including a communication unit, wherein the communication unit is controlled to
    receive predetermined messages from a plurality of terminal apparatuses based on a two-step random access procedure,
    transmit one signal including a physical downlink control channel (PDCCH) and a physical downlink shared channel (PDSCH) including pieces of upper layer control information for the respective terminal apparatuses in a multiplexed manner to the plurality of terminal apparatuses, in response to the predetermined messages,
    designate first radio resources using which response signals indicating whether or not succeeded in receiving the control information are to be transmitted in response to the one signal and that are different between the plurality of terminal apparatuses, using information designating a predetermined reference radio resource by the PDCCH of the one signal and designating difference between respective one of the first radio resources and the predetermined reference radio resource by the PDSCH of the one signal, and
    receive the response signals from the plurality of terminal apparatuses, respectively, in the first radio resources designated with respect to the respective terminal apparatuses.

4. The base station apparatus according to claim 3, wherein the communication unit designates the difference between respective one of the first radio resources and the predetermined reference radio resource for the respective terminal apparatuses using information included in MAC (media access control) sub-headers for transmitting pieces of control information for the respective terminal apparatuses in the PDSCH of the one signal.

5. The base station apparatus according to claim 3, wherein the communication unit, upon receiving the predetermined message from only one terminal apparatus, waits for the predetermined message from another terminal apparatus for a predetermined period of time without transmitting the one signal.

6. The base station apparatus according to claim 3,
wherein the communication unit, upon receiving the response signal indicating reception failure of the control information from one terminal apparatus of the plurality of terminal apparatuses, retransmits the one signal including the PDCCH and the PDSCH including pieces of upper layer control information for the respective terminal apparatuses in a multiplexed manner to the one terminal apparatus.

7. A control method to be executed by a terminal apparatus, comprising:
   transmitting a predetermined message to a base station apparatus based on a two-step random access procedure,
   upon receiving one signal that is transmitted from the base station apparatus in response to the predetermined message, and includes a physical downlink control channel (PDCCH) and a physical downlink shared channel (PDSCH) including pieces of upper layer control information for the terminal apparatus and another terminal apparatus in a multiplexed manner,
   specifying a first radio resource for transmitting a first response signal indicating whether or not succeeded in receiving control information that is for the terminal apparatus and is included in the one signal, and is different from a second radio resource for transmitting a second response signal indicating whether or not the other terminal apparatus has succeeded in receiving control information that is for the other terminal apparatus and is included in the one signal, based on information designating a predetermined reference radio resource by the PDCCH of the one signal and designating difference between the first radio resource and the predetermined reference radio resource provided in the PDSCH of the one signal, and
   transmitting the first response signal using the first radio resource.

8. A control method that is to be executed by a base station apparatus, comprising:
   receiving predetermined messages from a plurality of terminal apparatuses based on a two-step random access procedure,
   transmitting one signal including a physical downlink control channel (PDCCH) and a physical downlink shared channel (PDSCH) including pieces of upper layer control information for the respective terminal apparatuses in a multiplexed manner to the plurality of terminal apparatuses, in response to the predetermined messages,
   designating first radio resources using which response signals indicating whether or not succeeded in receiving the control information are to be transmitted in response to the one signal and that are different between the plurality of terminal apparatuses, using information designating a predetermined reference radio resource by the PDCCH of the one signal and designating difference between respective one of the first radio resources and the predetermined reference radio resource by the PDSCH of the one signal, and
   receiving the response signals from the plurality of terminal apparatuses, respectively, in the first radio resources designated with respect to the respective terminal apparatuses.

* * * * *